United States Patent [19]

Müller

[11] 4,230,976

[45] Oct. 28, 1980

[54] BRUSHLESS, PERMANENT MAGNET D-C MOTOR WITH IMPROVED COMMUTATION CONTROL

[75] Inventor: Rolf Müller, St. Georgen, Fed. Rep. of Germany

[73] Assignee: Papst Motoren KG, St. Georgen, Fed. Rep. of Germany

[21] Appl. No.: 42,362

[22] Filed: May 25, 1979

Related U.S. Application Data

[60] Continuation of Ser. No. 879,143, Feb. 21, 1978, abandoned, which is a continuation-in-part of Ser. No. 627,130, Oct. 30, 1975, abandoned, which is a continuation-in-part of Ser. No. 527,345, Nov. 26, 1974, Pat. No. 3,986,086, which is a division of Ser. No. 363,290, May 23, 1973, Pat. No. 3,873,897.

[30] Foreign Application Priority Data

Feb. 3, 1978 [DE] Fed. Rep. of Germany ....... 2804561

[51] Int. Cl.² ............................................. H02K 37/00
[52] U.S. Cl. ..................................... 318/138; 318/254
[58] Field of Search ................................ 318/138, 254

[56] References Cited

U.S. PATENT DOCUMENTS

| 3,873,897 | 3/1975 | Müller | 318/138 |
| 3,986,086 | 10/1976 | Müller | 318/138 |

*Primary Examiner*—Gene Z. Rubinson
*Assistant Examiner*—John W. Redman
*Attorney, Agent, or Firm*—Frishauf, Holtz, Goodman & Woodward

[57] ABSTRACT

Controlled semiconductor switches are inserted in series with the armature windings of the motor. To effect commutation when the difference between counter emf and applied voltage is small, that is, when the counter emf is high, so that commutation of armature current is effected during low, or no armature current flow, the control circuit includes circuit elements connected to and controlling current flow in the stator winding to considerably reduce the flow therethrough shortly before the theoretical commutation time, and increase current, or connect current to flow only shortly after the theoretical commutation time so that reliable commutation is effected. These circuit elements may, for example, be capacitors, R/C networks, artificial inductances, and the like, or circuits superimposing additional commutating signals derived directly from the induced counter emf, or by a separate sensing coil to the power supply for the commutating element.

32 Claims, 10 Drawing Figures

BRUSHLESS, PERMANENT MAGNET D-C MOTOR WITH IMPROVED COMMUTATION CONTROL

This is a continuation of application Ser. No. 879,143, filed Feb. 21, 1978 now abandoned. The present application is a continuation-in-part of my prior application Ser. No. 627,130, filed Oct. 30, 1975, now abandoned, which is a continuation-in-part of application Ser. No. 527,345, now U.S. Pat. No. 3,986,086, filed Nov. 26, 1974 which, in turn, is a divisional application of U.S. Ser. No. 363,290, filed May 23, 1973, now U.S. Pat. No. 3,873,897.

Cross Reference to Related Patents and Applications

U.S. Pat. No. 3,873,897, Muller;
U.S. Pat No. 3,840,761; 3,906,320 Doemen; U.S. Ser. No. 570,837, Doemen; filed Apr. 23, 1975, now U.S. Pat. No. 4,030,005, all assigned to the assignee of the present application.

U.S. Pat. No. 3,873,897 relates to a brushless direct current motor which has an armature winding which is intermittently energized, and the divisional application U.S. Ser. 527,345 relates, specifically, to a control circuit for such motors. The present invention is directed to an improvement in brushless direct current motors which are energized by an alternating field, which field interacts with a permanent magnetic rotor. More particularly, the present invention relates to a brushless direct current motor with a single phase stator winding generating an alternating field, and having an electronic commutating device, such as one or more transistors, the conduction of which is controlled by a galvenomagnetic element, such as a Hall generator in dependence on the position of the rotor.

The term "single-phase winding" or "single-phase rotor", as used herein, should be understood to relate to motors, or their stator windings, respectively, in which an alternating field is generated, as distinguished from a rotating field processing circumferential around the motor, as in a multi-phase motor.

The present invention is particularly applicable to motors in which Hall generators are used to control commutation; and to motors in which auxiliary reluctance torques are generated, by suitably forming or constructing the magnetic circuit of which the stator is a part. Motors of such type are described, for example, in the parent application and resulting U.S. Pat. No. 3,873,897 and in U.S. Pat. No. 3,840,761 Doemen.

Commutation of the armature current in single-phase motors, that is, in motors in which a merely alternating or pulsing alternating field is generated, requires special measures to obtain optimum commutation, which measures are not generally necessary in the case of polyphase brushless d-c motors having rotating fields of conventional construction.

Optimum efficiency of operation can be obtained in brushless d-c motors by controlling current flow through the armature windings of the motor at a time when the counter-electromotive force (emf) is high. Any one phase winding should have current flow only during an angle of rotation of less than 180° electrical (-el) since, due to the unvoidable gaps between poles, and due to magnetic leakage, the full counter emf can never be induced during an angle of 180°-el. Current flow during an angle of about 170°-el, preferably less, is desirable if the rotor magnet has an approximately sinusoidal distribution of magnetization strength with respect to linear circumferential dimension; if the magnetization distribution is approximately trapeze-shaped, current flow during an angle of up to about 160°-el can be obtained, assuming that the constant value of the trapeze-shaped curve of the emf extends over 160°-el at the most.

It has previously been proposed to control the armature currents (which, in the case of permanent magnet motors, are the stator currents) by means of a position transducer, in dependence of angular position of the rotor. The transducer of the transducers of a transducer system provide unambiguous and independent signals for each one of the stator, that is the armature windings. Transducers which are suitable may be opto-electronic devices which respond to bright-dark magments of a control disk or similar device to unambiguously and independently define the angles of current flow. Overlapping of the currents in the individual coils or providing intervals or gaps between current flow is the individual coils can readily be achieved with such transducors.

Other transducers have been proposed, operating on the principle of radio frequency transmission, in which masks or shields are used to mask off propagation of radio frequency transmission, alternatively, masks or shields may be constructed in the form of ferrite sectors which control coupling between the rotor and a stationary elements so that the angles during which current flow is controlled will have the desired value.

The transducer systems referred to may be used with single-phase motors, by so constructing the control masks, shields or bright-dark sectors that the current in the motor is discontinued or OFF during computation; in other words, a pause or gap during current flow is commanded which is so arranged that it matches the time distribution of the induced counter cmf, that is, with constant speed, the angular distribution of the counter emf.

The current through the armature coils can also be controlled by mechanical or magnetic contacts operated by cams or control magnets on the shaft of the motor, so that the motor current is interrupted during the commutation period.

Other position transducers have been proposed which, however, do not provide unambiguous and independent signals which could be applied to the various inputs of control devices, such as transistors, for the armature coils. Such transducers have been combined in commutating circuits in which the induced voltage is sensed and utilized as an indication of the instantaneous angular position of the rotor. The control circuit must be so designed that a motor of this type is able to self-start; the circuit must provide that, even during standstill of the motor, that is, when no commutation signal is present, commutation of the current from one stator coil to the next takes place. Commutation is effected by disconnecting one coil or winding and connecting the next or subsequent coil or winding.

It is nor readily possible to interrupt current flow during commutation; in case of a single-phase brushless motor, the angle of current flow would be 180°-el, that is, too long for good efficiency. In case of a three-phase brushless motor, the angle of currant flow in 120°-el.

Hall generators are suitable transducer elements providing output signals from which the angular position of the rotor can be determined, and such elements are illustrated in the aforementioned U.S. patents. The Hall generators do not, however, generally permit free selection or control of the angle of current flow.

Hall generators, as known, provide two output voltages. Usually, two phases of a four-phase brushless d-c motor can be controlled thereby. These two output voltages are not independent of each other but, ignoring parasitic asymmetrics, have outputs which are the respective mirror images of each other, that is, when the output voltage of one terminal with respect to the control terminal rises, the output voltage of the other terminal drops, and vice versa. It is thus not possible to simultaneously decrease the output voltages of both output terminals without affecting the voltage applied to the control terminals of the Hall generator. Dropping the output voltages of both terminals may be desired, however, in order to switch OFF the transistors connected to both of the output terminals of the Hall generators to obtain a clearly defined gap in current flow through the armature winding during the commutation interval. Thus, in simple motor circuits using Hall generators as transducers, the angle of current flow is appropriately 180°-el.

Figure 2:
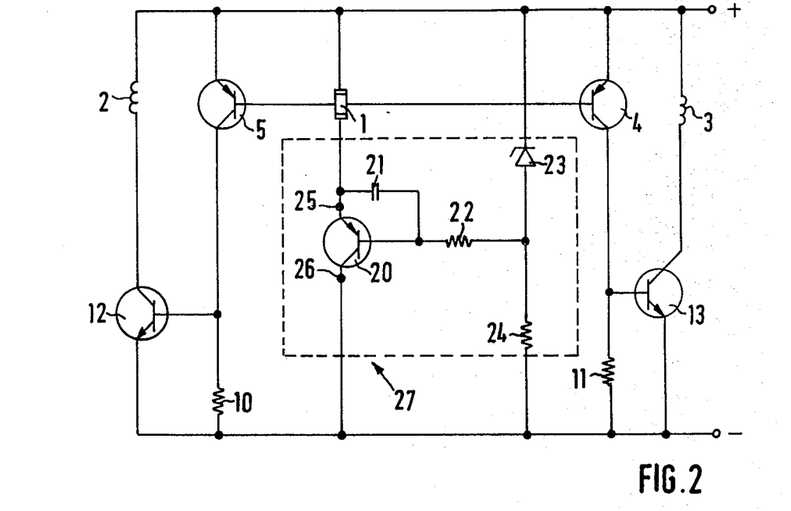
FIG. 2 illustrates a commutating circuit with a Hall generator supplied over an impedance element operating as an inductance.

German Disclosure Document DT-OS No. 1,954,409, and particularly FIG. 2 thereof, shows a circuit for a fourphase brushless d-c motor in which the angle of current flow is only 90°-el per phase. This improves motor efficiency and there is a considerable decrease in loading of the components, with respect to the simple circuit. The solution to the problem as disclosed is to use four input stage transistors, forming a quadruple differential amplifier, which four transistors are connected together by a common emitter resistor. Only that one of the transistors will become conduction which has the highest output voltage of the four output voltage derived from two Hall generators. The angle of current flow in the output stage transistors controlled by the driver transistors is therefore 90°-el, neglecting asymmetries in the circuits. This principle to reduce current flow in the armature winding of a brushless d-c motor obviously is not applicable to single-phase brushless d-c motors, since the disclosed principle is based on the consideration that the angle of current flow in one stator coil is equal to the nth part of the electrical angle of rotation, n being the number of transistors combined in a differential stage. In case of a single-phase brushless d-c motor with only two transistors in the preamplifier or driver or in the output stage, this angle is 180°-el, and it would not be reduced, and the aforementioned disadvantages of poor efficiency at high loading of the windings and particularly of the output stage transistors would still occur.

It is an object of the present invention to provide a d-c brushless motor with improved efficiency, having improved smoothness of operation and hence having reduced operating noise, without requiring substantial additional expenditure in components or complexity, and while further reducing the loading on the output or final end stage transistors or similar control elements.

SUBJECT MATTER OF THE PRESENT INVENTION

Briefly, a galvanomagnetic element, such as a Hall generator, controlling the conduction state of the commutating devices, typically transistors, is connected to and controlled by means which considerably reduce, or entirely interrupt current flow in the armature winding shortly before the theoretical commutating time occurs, and only increase, or entirely switch ON the current flow through the armature winding after the theoretical commutating time. The angle of current flow through the winding paths of the phases, or the respective winding direction, is held at a value clearly below 180°-el.

In accordance with a preferred feature of the invention, the angle of current flow is so matched to the time (or circumferential, respectively) distribution of induced voltage that current flow occurs during the range of induction of maximum voltage. The time (or circumferential) distribution of induced voltages may have sinusoidal or trapezoidal shape; the corresponding angles of current flow for sinusoidal magnetization are preferably less than 120°-el, while for trapezoidal magnetization, a current flow angle of up to about 160°-el is suitable.

The present invention is particularly suitable when applied to motors of the axial air gap or pancake type since, especially in such motors, the operating noise level is markedly reduced. The invention is applicable to all types of motors, however, having cylindrical or axial air gaps and provides an improvement in operating efficiency by several percent, for example a change in improvement of from 50 to 55%.

Figures 1, 6:
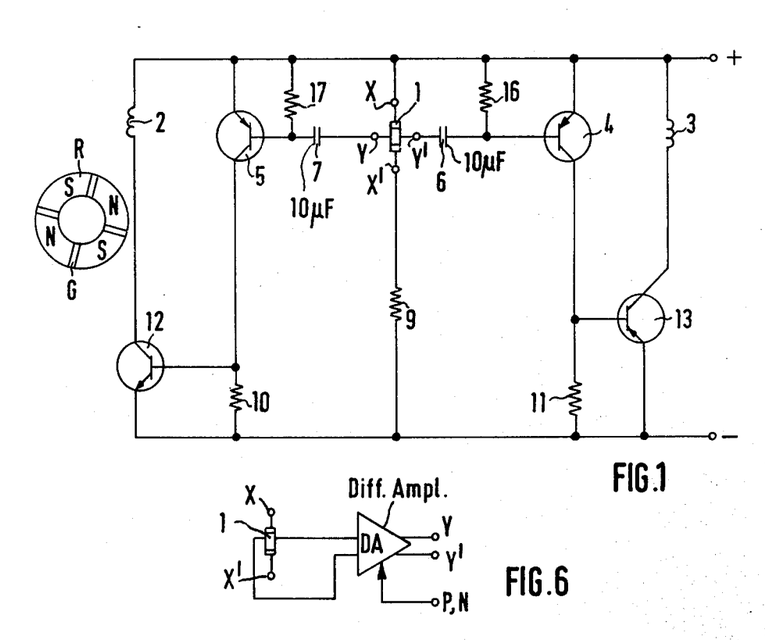
FIG. 1 is a highly schematic circuit diagram illustrating a commutating circuit connected to two windings of a single-phase permanent magnet (PM) d-c motor, using a Hall generators.
FIG. 6 is a fragmentary circuit, for combination with the circuit of FIG. 1, and showing another embodiment.

The invention will be described by way of example with reference to the accompanying drawings, wherein:

FIG. 1 illustrates, highly schematically, a permanent magnet rotor R having axially magnetized portions with Northpoles and Southpoles N, S separated by pole gaps G, which are shown in exaggerated fashion. The entire rotor structure may be a uniform cylindrical structure of magnetic material which is magnetized, as shown.

The rotor is located in magnetically coupled relation to two coil windings 2, 3 located on a stator plate. The physical arrangement is illustrated, for example, in U.S. Pat. Nos. 3,906,320; 3,873,897; 3,840,761. The stator, preferably formed as a flat plate in case of an axial air gap motor, also carries a Hall generator 1. Positive and negative buses P, N are connected to windings 2, 3 and to one terminal of Hall generator 1. The windings 2, 3 are series connected with respective power switching transistors 12, 13 and are then connected to negative bus N. The other terminal of the control path of Hall generator 1 is connected through a resistor 9 to negative bus N. Two switching transistors 4, 5 have their respective bases connected through respective capacitors 6, 7 to the output terminals of Hall generator 1. The collectors of transistors 4, 5 are connected to the bases of the respective transistors 13, 12 and through base resistors 11, 10 to negative bus N. Respective resistors 16, 17 are connected from positive bus P to the junction of the respective base of the transistor 4, 5 and the associated terminals of capacitors 6, 7.

Operation of the circuit of FIG. 1: The diode path of the emitter-base of transistors 4, 5, in parallel with the respective resistors 16, 17 forms a non-linear resistance path. For voltages which have a polarity opposite that of the conductive direction of the emitter-base diode, the resistance of the respective resistors 16, 17 is controlling, and corresponds, practically, to that resistance; for voltages having a polarity corresponding to the current flow direction of the emitter-base diode, and exceeding the threshold value of the diode, the resistance is much less. If such a non-linear resistor is supplied with a since wave from a capacitor, in the illustration of FIG. 1 capacitors 6, 7, respectively, then the much smaller resistance in the current passing direction of the diodes 4, 5 causes a decrease in the duration during which current flow can persist in the respective diode, that is, a current flow persisting for less than 180°-el. This ensures that the collector current of the transistors 4, 5, as well as that of the output switching transistors 13, 12, persists for less than 180°-el.

The circuit may be broken at points X–X' and Y–Y' and the circuit of FIG. 6 substituted instead. The Hall generator 1 is replaced by a composite circuit which includes the Hall generator itself and a difference preamplifier DA, the output of which is connected to the respective terminals of capacitors 6, 7. This permits use of a Hall generator with a smaller Hall output voltage. Resistor 9 controls the current flow through the Hall generator. If resistor 9 is so dimensioned that only a small control current is permitted, for example to decrease thermal effects or loading, then small Hall output voltages are obtained. These small output voltages may not be sufficient to properly control the transistors 4, 5 and, for low Hall voltages, a preamplifier, constructed as a differential amplifier DA, may be used.

The basic circuit of the motor windings 2, 3, the associated switching transistors 12, 13 and preamplifiers will not be explained again in connectiion with explanation of the other figures; only those elements which are changed will be described and explained in detail.

FIG. 2: The output voltage of the Hall generator may be made independent of temperature and operating voltage if the Hall generator is supplied by a separate supply circuit 27. Hall generator 1 has a higher internal resistance when it is subjected to a magnetic field; its internal resistance decreases to a minimum when the magnetic field disappears. This is the time when the direction of the field to which the Hall generator is subjected changes, as the rotor R of the motor rotates. The control path of the Hall generator thus operates similarly to a magnetic field plate, that is, similarly to a magnetic-field responsive resistor having only two terminals. The circuit 27 has a transistor 20 connected by terminals 25, 26 in lieu of resistor 9 (FIG. 1). The emitter-base path of the transistor is bridged by a capacitor 21, for example of 22 $\mu$F, and the base is connected by a resistor 22, for example of 2 k$\Omega$ to a stabilized voltage supply provided by a series circuit of a Zener diode 23 and a resistor 24. The capacitor 21 is so dimensioned that the control path of the transistor 20 is rendered ineffective at the undulating frequency of the field, so that the differential resistance of the supply circuit 27 is formed, essentially, by the resistance of resistor 22. At low frequency, the transistor 20 acts as an impedance transformer and reduces the internal resistance of the supply circuit by approximately the factor of its current amplification. The circuit operates similarly to a phantom or artificial inductivity.

Figure 3:
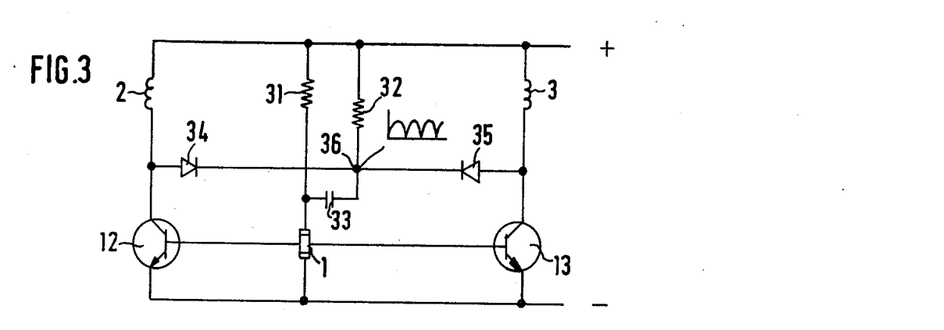
FIG. 3 shows a commutating circuit with a Hall generator, on whose supply current an alternating current component derived from the induced voltage is superimposed.

FIG. 3: The voltage induced in the windings 2, 3 of the stator coil, and schematically shown in FIG. 3, is coupled out by means of diodes 34, 35, respectively, connected to the junction of the respective windings 2, 3, and the collector of the respective switching transistors 12, 13. The switching transistors 12, 13 have their respective bases directly connected to Hall generator 1, rather than connected through preamplifier transistors. The junction of Hall generator 1 and its dropping resistor 31 is connected by means of a capacitor 33 to the junction 36 at which the induced voltage $v_3$ appears. This voltage is dropped across resistor 32. The induced voltage has twice the frequency of the switching frequency of Hall generator 1, and this voltage is superimposed on the switching frequency generated by Hall generator 1 upon rotation of rotor R. The voltage $v_3$ reduces the control current during the periods of time in which only a small or no voltage is induced in the windings 3, 4. Thus, transistors 12 and 13 do not receive sufficient control voltage during those time periods, so that the desired interruption of motor current during commutation is obtained.

Figure 4:
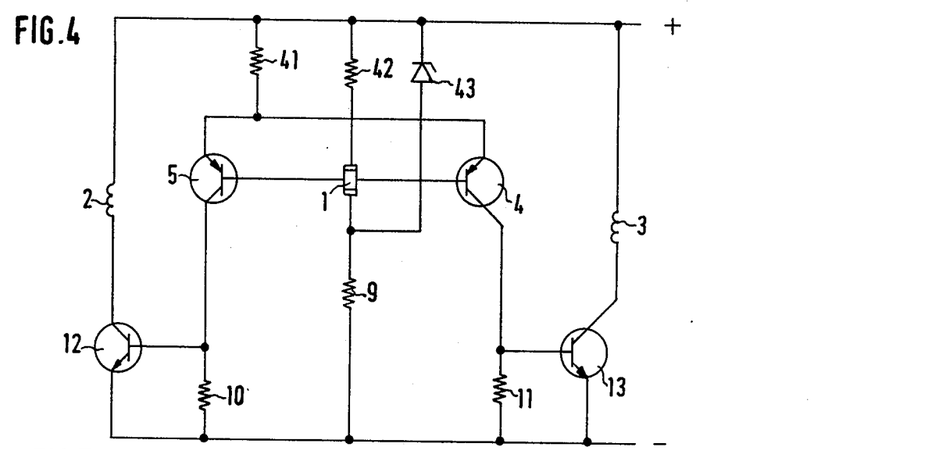
FIG. 4 shows a commutating circuit with a Hall generator controlling a differential stage, whose output signals are controlling a final output amplifier having a highly nonlinear characteristic.

FIG. 4: The basic circuit is similar to that of FIG. 1, except that a Zener diode is provided, connected to the junction of Hall generator 1 and resistor 9 to provide a predetermined output current from the Hall generator 1 to control the emitter current of the respective transistor 4, 5. This emitter current is clamped by the Zener diode 43 and by the effect of resistor 41, with respect to the resistance value of resistor 42, connected in series with the Hall generator 1. In operation, the resistance of resistor 41 is so selected with respect to the Zener voltage of Zener diode 43 that an emitter current will flow through the respective transistor 4, 5—when conductive—that when the difference amplifier formed by transistors 4 and 5 is in balance, the collector currents of the transistors 4 and 5 are equal. Thus, the voltages which are dropped across the respective power transistor base resistors 10, 11 will be less than the threshold value of the respective connected power transistor 12, 13, so that neither of the transistors will be conductive. This balance state of the difference amplifier formed by transistors 4, 5 will occur when the Hall generator is in a magnetically neutral field, that is, is magnetically not excited. This state occurs at the instant of field reversal, that is, when gap G (FIG. 1) of the rotor R is aligned with the Hall generator. The arrangement effects interruption or at least substantial decrease of the motor current during commutation. The Zener volage of Zener diode 43 may, for example, be 5.6 V. If resistor 41 has a resistance value of 510 ohms, then resistor 41 will have a current of 10 μA flowing therethrough. When the output terminals of the Hall generator 1, connected to the respective bases of transistors 4, 5 are essentially equal, then the current of 10 μA distributes essentially equally to transistors 4 and 5. Each one of the transistors 4, 5 thus will have an emitter current of about 5 μA. The resistors 10 and 11, each of about 100 ohms, will then have a voltage drop of 0.5 V thereacross. This voltage is insufficient to switch ON the respective transistors 12, 13, that is, to control these transistors to change to conductive state, assuming these transistors to be silicon transisstors having a base-emitter voltage of at least 0.6 V. Thus, interruption of current flow through the windings 2, 3 of the rotor armature is ensured since the respective series connected switching transistors 12, 13 will be in blocked state.

Figure 5:
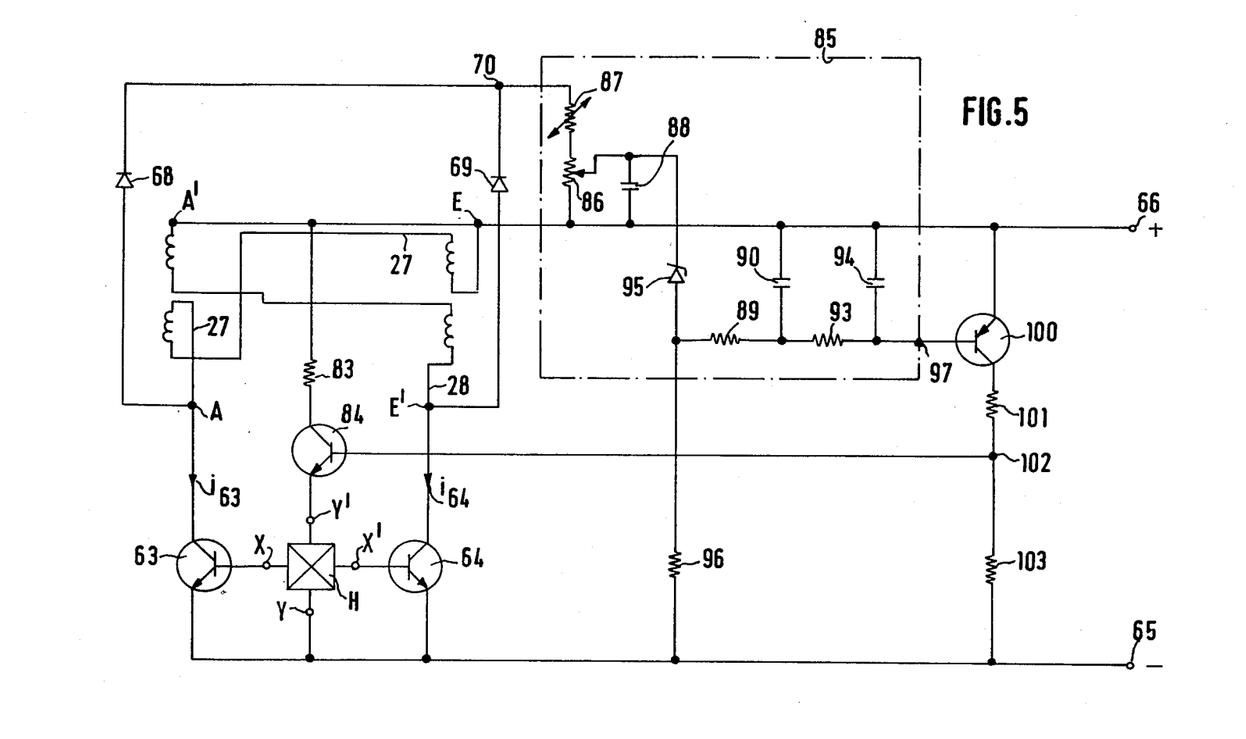
FIG. 5 shows a control circuit which uses the a-c component of sensed induced voltage to produce current intervals or gaps, and which is further combined with a phase shift circuit and, in general, shows combination of the inventive concept of this application with that disclosed in FIG. 3 of U.S. Pat. No. 3,873,897, and described in detail therein.

FIG. 5 illustrates a complete control circuit including a dividing network and a phase inverter, and corresponds essentially to FIG. 3 of Pat. No. 3,873,897, assigned to the assignee of the present invention, the disclosure of which is herein incorporated by reference. Hall generator H, which has the reference numeral 41 in the aforementioned U.S. Patent Nos. 3,873,897 and 3,906,320, may be replaced by the network of FIG. 6 of the present application, as schematically indicated by the connection terminals X, X', Y, Y'. The circuit of FIG. 1 may be used by connecting the capacitor-resistance network 6, 16, 7, 17 of FIG. 1 between terminals X, X' and the base of the respective power transistor 63, 64 as shown in FIG. 5; the circuits described in the other embodiments may likewise be used, for example by applying a portion of the voltage appearing across terminals 70 and 66 of FIG. 5 additionally to the base of transistor 84 to ensure blocking of both transistors 63, 64 at the commutation instant, thereby incorporating the concept of FIG. 3 of the present application in the speed control circuit of FIG. 5. Similarly, the resistor 83 of FIG. 5 may be replaced by the circuit 27, so that the effect of blocking both transistors 63, 64 at the commutation instant is obtained in accordance with the embodiment of FIG. 2.

Figure 7:
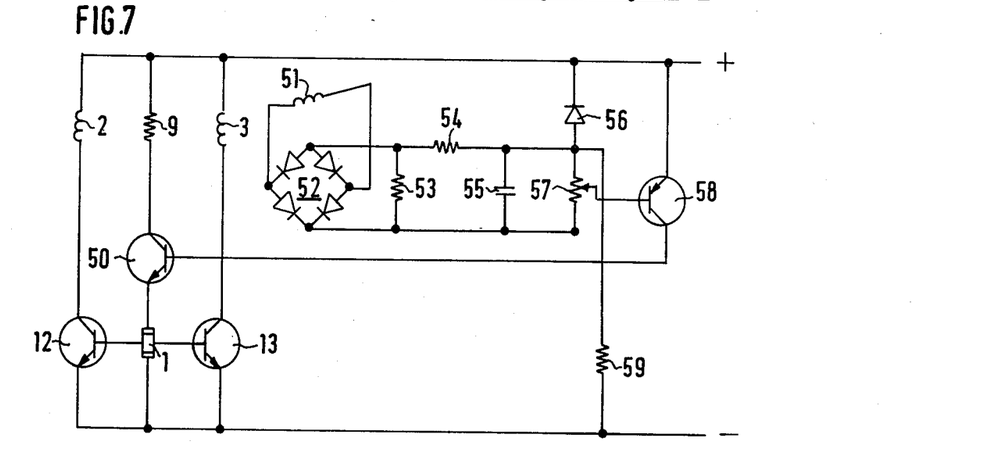
FIG. 7 shows a control circuit with a separate measuring coil, spatially displaced from the main stator coils by 45° to 80°-el. which utilizes the a-c compound of sensed, induced voltage.

Another embodiment of a speed control circuit is illustrated in FIG. 7. An auxiliary winding 51 is provided, connected across a bridge 52. The other diagonal output of the bridge is connected to a network of resistances and a capacitor 53, 54, 55, and applied to a potentiometer 57, one terminal of which has a fixed voltage applied thereto derived from Zener diode 56. The slider of potentiometer 57 is connected to the base of a transistor 58, the emitter-collector path of which is connected to the base of transistor 50, connected in series with Hall generator 1 and dropping resistor 9. A resistor 59, connected in series with Zener diode 56, provides the reference voltage.

Operation of circuit of FIG. 7: Auxiliary winding 51 is provided on the stator and so located to have a voltage induced therein which is proportional to speed. This voltage is rectified in bridge 52. Bridge 52 is loaded by resistor 53. The R/C network formed by resistor 54 and capacitor 55 provides for partial smoothing of the rectified voltage and simultaneously shifts the phase thereof with respect to the voltage on winding 51 by at leasg 45°-el. Zener diode 56 and resistor 59 provide a reference voltage. A difference signal formed by the voltage across capacitor 55 and the reference voltage at the junction of Zener diode 56 and resistor 59 is taken off the slider position or tap of potentiometer 57; the voltage will be proportional to the speed, and is applied, in customary manner, to a control amplifier formed of transistors 58 and 50. The remaining undulation of the control voltage, that is, its waviness, is superimposed to the supply current of the Hall generator. This superimposed waviness occurs at the proper time to effect the desired decrease, or complete interruption of motor current during the commutation instant.

The various circuits of the present invention provide simplifications and other embodiments of the circuits shown and described in co-pending application Ser. No. 570,837, Doeman, now U.S. Pat. No. 4,030,005, assigned to the assignee of the present application, which also includes features directed to applying operating voltages to the energising or armature windings only when the counter emf is high. Current through the motor winding should be interrupted, or already OFF, when the counter cmf is on its decreasing curve portion. This leads to higher efficiency and smaller interrupting peaks, and less radio interference, and contributes to silence in operation. Further, the switching transistors can be used to optimum efficiency so that smaller size components can be used, readily fitted into the smaller motor structure, or combined therewith.

The present invention is applicable to motors having a uniform air gap, and a uniform magnetic structure, as well as to motors in which an auxiliary reluctance torque is generated, displaced relatively to the electrodynamically generated torue, as explained in the cross-referenced patents. A particularly noticeable reduction in noise level during operation can be obtained when the invention is applied to axial air gap motors, although it is applicable to any types of motors.

A motor designed for operation at about 3000 rpm, and using the circuit of FIG. 2, may use a capacitor 21 of about 22 μF, a resistor 22 of a value of 2 kΩ. In the circuit in accordance with FIG. 3, resistor 31 may, for example, have 33 ohms, resistor 32 1 kΩ and capacitor 33 220 μF. In the circuit of FIG. 1, or of FIG. 6, respectively, capacitors 6, 7 may have a value of about 10 μF, and resistors 16, 17 a value of about 5 kΩ.

Figure 8:
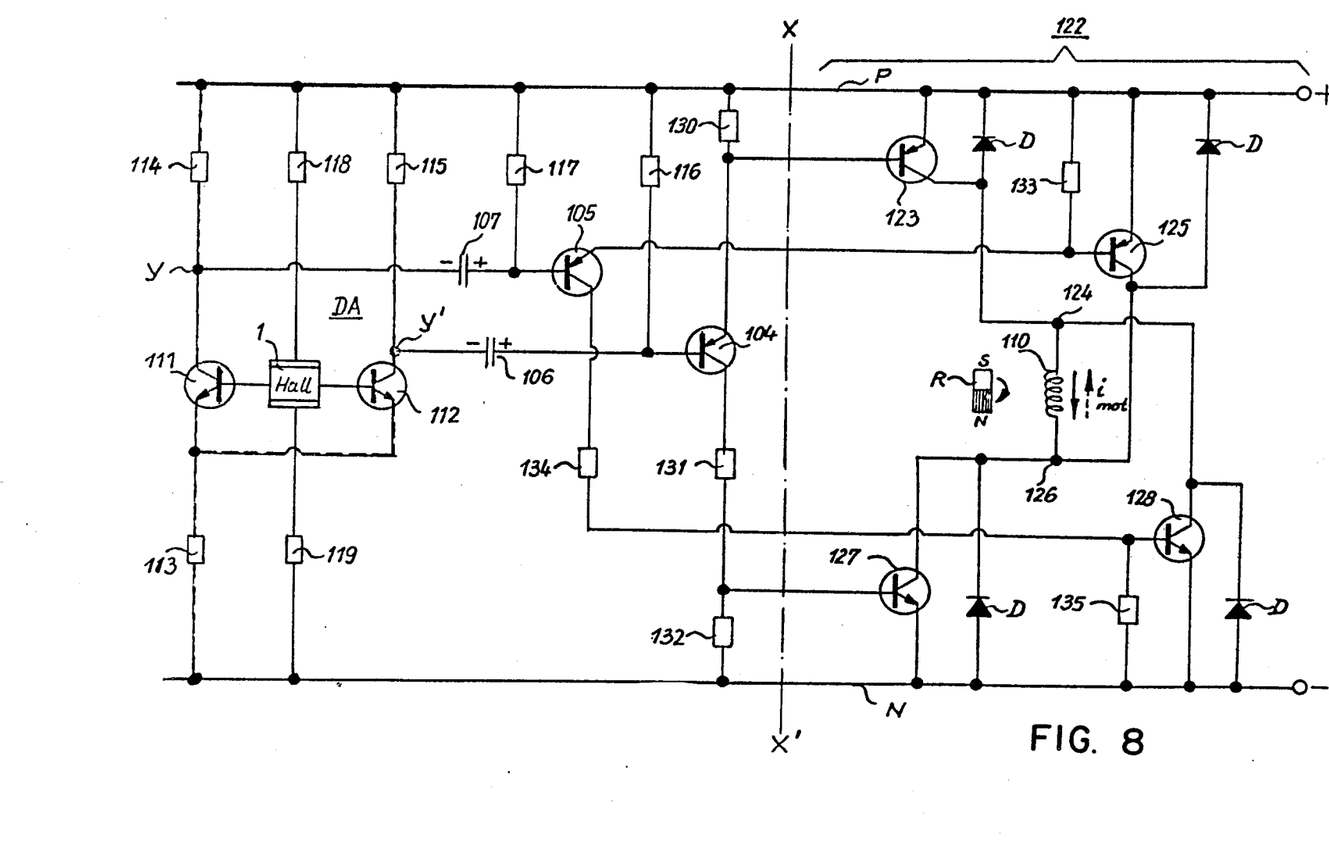
FIG. 8 is a circuit diagram of a brushless d-c motor which a single stator winding, supplied with current pulses of alternating direction over a bridge circuit, in which there are pauses or gaps between the respective current pulses.

Embodiment of FIG. 8: The left portion of the circuit. that is, up to the chain-dotted X-X', is, essentially, a combination of the circuit of FIGS. 1 and 6. The power portion, at the right side of the chain-dotted line X-X' differs from FIG. 1 to illustrate another embodiment, but it could be constructed in the same manner as FIG. 1.

Figure 9:
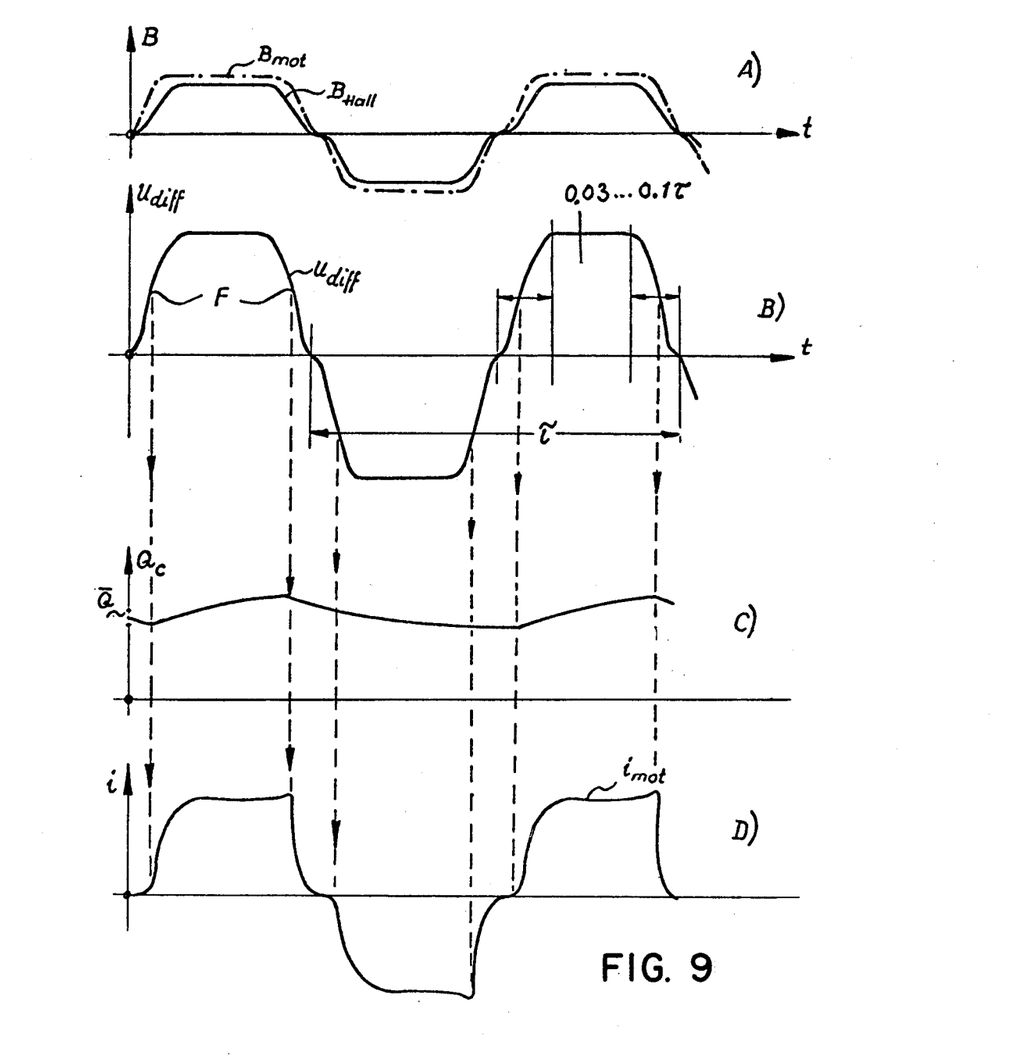
FIG. 9 is a series of graphs illustrating magnetic field, voltage, capacitor charge, and current relationship, with respect to time.

The motor of FIG. 8 can be constructed, physically, to be similar to the motor of FIGS. 1 to 5 of the aforementioned cross-referenced application Ser. No. 570,837, now U.S. Pat. No. 4,030,005, Doemen, with the difference that winding 110 (referring to U.S. Pat. No. 4,030,005) is the only motor winding. This motor winding is connected between terminals 28, 29 (U.S. Pat. No. 4,030,005). The flux relationships which arise in this motor are illustrated in FIG. 9, graph A, which corresponds to FIG. 3 of U.S. Pat. No. 4,030,005. The magnetization $B_{mot}$ of the motor portion of the motor R is trapeze-shaped with steep flanks and small gaps between the respective poles. The magnetization of the Hall generator 1, $B_{Hall}$, which, controls the rotor R will also be trapeze-shaped, but the flanks will have less steepness or slope. Consequently, the motor current $i_{mot}$ is already turned off when full counter-emf is still induced by the rotor R in the winding 110. This decreases voltage peaks and noise, as explained in the cross-referenced U.S. Pat. No. 4,030,005.

The output voltage of Hall generator 1 (FIG. 8) which, actually, practically conforms to the magnetization curve at $B_{Hall}$, is essentially linearly amplified by differential amplifier DA. The portion of the differential amplifier is emphasized in FIG. 8 by the addition of a broken line to the circuit connections of FIG. 8. The differential amplifier includes two transistors 111, 112, the bases of which are connected, each, to an output of the Hall generator 1. Their emitters are connected over a common emitter resistor 113 with negative bus N. The collectors of the transistors 111, 112 are connected over a respective collector resistor 114, 115 with positive bus B. The voltage between buses P and N may, for example, be in the range of between about 24 to 30 V d-c.

Hall generator 1 is connected over resistor 118 with bus P and over resistor 119 with negative bus N. As shown schematically in FIG. 6, the two outputs of the differential amplifier DA are illustrated at Y and Y', respectively, and, as in FIGS. 1 and 6, are connected over capacitors 107, 106, respectively, with the bases of associated transistors 105, 104 and over a resistor 116, 117, respectively, with positive bus P. Transistors 104, 105 correspond to transistors 4, 5 of FIG. 1; resistors 116, 117 to resistors 16, 17 of FIG. 1, and capacitors 106, 107 to capacitors 6, 7 of FIG. 1.

The transistors 104, 105 can be connected similar to the connection of transistors 4, 5 of FIG. 1, that is over power transistors 12, 13 to control partial windings 2, 3 of the motor. In a circuit which is now preferred, a bridge circuit is used, shown to the right of the chain-dotted line X–X'. The bridge circuit 122 uses only a single winding 110 rather than two windings 2, 3 of FIG. 1. The rotor R is shown only schematically. Winding 110 is connected to the diagonal of a bridge circuit which has four branches:

(1) from one pnp transistor 123, the emitter of which is connected to bus p and the collector of which is connected to the upper terminal 124 of the winding 110;

(2) from one pnp transistor 125, the emitter of which is connected with bus P and the collector to the lower terminal 126 of winding 110;

(3) from an npn transistor 127, the emitter of which is connected with bus N and the collector to the terminal 126; and (4) from an npn transistor 128, the emitter of which is connected with the bus N and the collector to the terminal 124.

Peak suppression diodes D are, respectively, connected with reverse polarity in parallel to the respective transistors 123, 125, 127, 128. The transistors 123, 125, 128 are controlled, respectively, in pairs so that either 125 and 128, or 123 and 127 are conductive. Transistors 123, 127 are controlled by transistor 104; transistors 125 and 128 by driver transistor 105.

The emitter of transistor 104 is directly connected to the base of transistor 123 and over a resistor 130 with the bus P. Its collector is connected over a resistor 131 with the base of transistor 127 which, in turn, is connected over resistor 132 with negative bus N.

Similarly, the emitter of transistor 105 is connected with the base of transistor 125 and over resistor 133 with the bus P. The collector is connected over resistor 134 with the base of transistor 128 and over resistor 135 with the bus N.

In an illustrative example, designed for a power supply of from between 24 to 32 V d-c between buses P and N, the following values are suitable:

| Hall generator 1 | Siemens SBV 566 |
|---|---|
| resistors 118, 119 | 0.8 kΩ |
| resistor 113 | 8.2 kΩ |
| transistors 111, 112 | BC 237A |
| capacitors 106, 107 | 3.3 μF |
| transistors 104, 105 | BC 307C |
| resistors 116, 117 | 39 kΩ |
| transistors 123, 125 | BD 234 |
| transistors 127, 128 | BD 235 |
| resistors 114, 115, 130, 132, 133, 135 | 10 kΩ |
| resistors 131, 134 | 0.6 kΩ |

The winding 110 has a d-c resistance of about 9 Ω. The power obtained from the motor of 3000 rpm is between about 10 to 20 W.

Operation, with reference to FIG. 9: Upon connection of the circuit, rotor R is in a preferred position in which either a North or Southpole thereof is opposite of Hall generator 1. Let it be assumed that the right output of Hall generator 1 is positive, and the left output negative. Transistor 112 is conductive and transistor 111 blocked. Since capacitor 106 is discharged upon first connection, the transistors 123, 124 will have a current flow thereover to charge capacitor 106. Simultaneously, charge will flow over resistor 116 to capacitor 106. Transistors 104, 123, 127 will become conductive, winding 110 will have current flowing therethrough from bus P to N, that is, vertically downwardly with reference to FIG. 8, and rotor R starts to turn in the desired direction.

Upon rotation, a pole of the opposite polarity will become positioned opposite Hall generator 1, so that the left output will become positive and the right output negative. Transistor 112 will block, transistor 111 will become conductive. When the transistor 112 blocks, the base of transistor 104 will receive a voltage which is more positive than that of bus P, since the voltage on capacitor 106 is added to that of the voltage of the bus P. This blocks transistors 104, 123, 128. Transistor 111 will become conductive and charge current can flow through capacitor 108 over the control paths of transistors 125, 105, rendering transistors 105, 125, 128 conductive. Current will now flow through winding 110 in the reverse direction, that is, upwardly from below (as indicated in broken line in FIG. 8). Simultaneously, capacitor 106 can discharge over resistors 116, 115. This discharge will be comparatively slow since resistors 116, 115, together, have a value of about 50 kOhm.

The cycle will repeat continuously and capacitors 106, 107 will assume an average charge $\bar{Q}$. The charge on the capacitors rises rapidly when the associated transistor 104, 105 becomes conductive and drops slowly when the associated transistor blocks. Since the voltage at the capacitors 106, 107 is proportional to the charge Q, the voltage at the capacitors rises and drops cyclically because the capacitors receive energy and then release energy. The rapid rise of voltage upon supply of energy and the subsequent slow voltage drop upon discharge result in an operation which, as illustrated in FIG. 9, causes transistors 104, 105 to become conductive only when the associated output of Hall generators 1 has a predetermined voltage difference with respect to the other output, that is, and as illustrated in graph D of FIG. 9, current will flow in the motor winding 110 in pulses only during a restricted portion of the half cycles upon rotation of the rotor, that is, only during about 140°-el. to 160°-el. (out of a theoretical 180°-el.). A current gap or pause occurs between two subsequent current pulses. This gap or pause reliably prevents simultaneous conduction of all the transistors 123, 125, 127 128, which would mean a short circuit. If the charge and discharge time should be equal, then the respective capacitor would have to be charged to a greater and greater extent. Since, however, the average charge $\overline{Q}$ tends to assume a balance, the charge and discharge time must be different, since the charge and discharge rates are different.

The operation is largely based on the essentially linear amplification by the differential amplifier DA which amplifies the voltage of Hall generator 1 essentially linearly, that is, as illustrated in graph B of FIG. 9. The output voltage $u_{diff}$ of the differential amplifier corresponds essentially to the flux diagram of graph A of FIG. 9. The flanks F of the voltage of graph B have a somewhat smaller or lesser slope, the rise of which extends over an angular range of about 10° to 35°-el. Likewise, the drop extends over a somewhat wider angular range.

If the rotor R is blocked, for example in a position in which the transistor 112 is conductive, then charge current will flow through the control paths of transistors 123 and 124 to the capacitor 106 until it is charged. Thereafter, however, transistor 104 will not received base current anymore, and will not be conductive. This will entirely disconnect the motor winding 110, that is, the motor will be disconnected from the power supply about one second after blocking. Only a very small current will flow through Hall generator 1 and the transistor 112. This is an inherent safety feature of the circuit, and prevents high current flow upon blocking of the rotor.

The circuit, therefore, provides the desired gaps between the current pulses $i_{mot}$, as seen in graph D of FIG. 9; the desired reliability against excessive currents upon blockage of the rotor, since the motor winding will be deenergized and, consequently, cannot burn out; and additionally, the capacitative coupling by capacitors 106, 107 suppresses the unavoidable dissymmetry of the output voltages of the Hall generator 1, since only the a-c component of the output voltage is transferred.

The differential amplifier DA, utilized in the preferred embodiment, has the advantage that even if the Hall generators 1 are of less than excellent quality, reliable safety against rotor blockage is ensured and even at high motor temperatures, that is, with small Hall voltages, the motor will reliably start.

Figure 10:
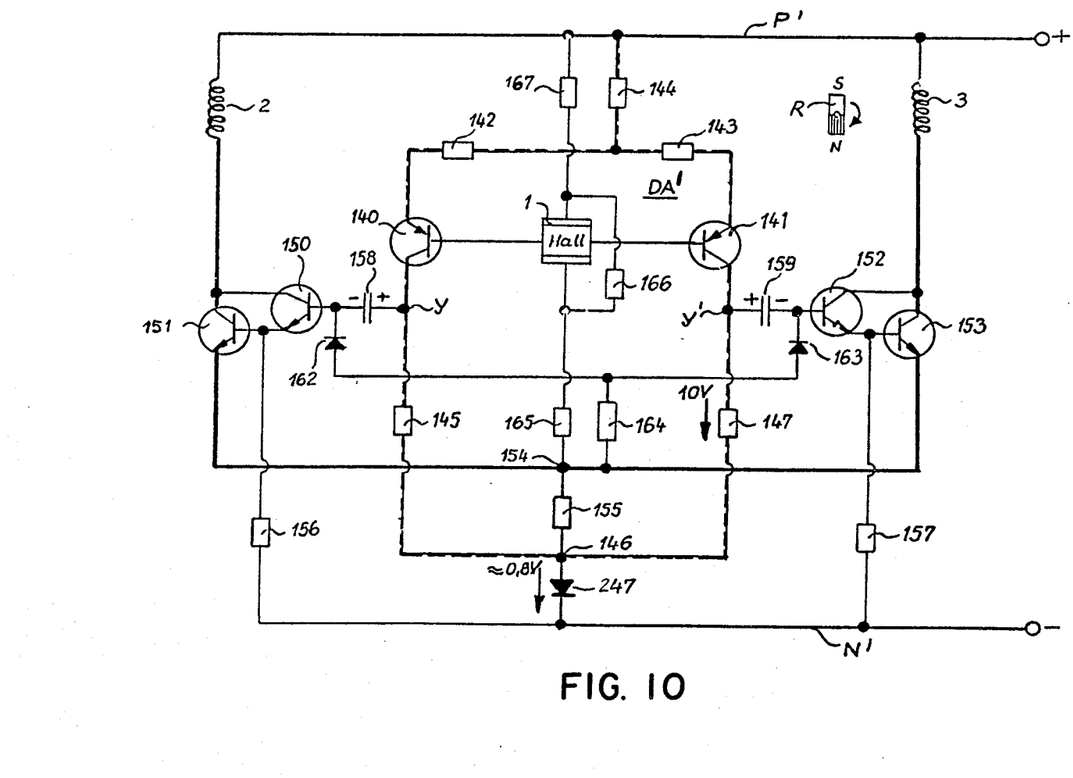
FIG. 10 is a schematic diagram of a circuit similar to the circuit of FIG. 1, for a motor with two stator windings which are alternately supplied with unipolar pulses, each of which are shorter than 180°-el.

Embodiment of FIG. 10: The circuit uses two motor windings 2, 3, as illustrated in FIG. 1, and a Hall generator 1. The motor can be constructed similar to the structure shown in FIGS. 1 to 5 of the aforementioned Pat. No. 4,030,005, Doemen.

A differential amplifier DA' amplifies the output voltage of the Hall generator 1. The outputs thereof are labelled Y,Y' as in FIG. 6. The circuit of DA' is emphasized by broken lines in addition to the connecting lines. The motor circuits are shown with heavy lines to facilitate analysis of the circuit.

The embodiment of FIG. 10 is particularly desirable if the operating voltages are increased, for example if the voltages between buses N', P' rise to, for example, the range of about 60 V. This requires output transistors of suitable voltage carrying capability. The circuit is suitable with Hall generators of mediocre quality, that is, providing low output voltages, and reliably starts even at high operating temperatures. The starting current is limited and, yet, the motor provides for rapid acceleration to rated speed. The motor is safe against rotor blockage. Additionally, the Hall generator may be of such poor quality that the diisymmetry of the outputs if noticeable; such dissymmetry results in the Hall generator providing some output voltage even though no magnetic field is acting thereon.

Upon blockage of the rotor, the coupling capacitors are charged to only relatively low voltages so that electrolytic capacitors can be used. Nevertheless, the leakage currents of these capacitors cannot cause the output transistors which, for example, may be Darlington combinations, to become conductive. Thus, in spite of the use of leaky electrolytic capacitors, the motor is protected against blockage, even under high temperature conditions, which are not further increased due to overheating of the motor itself. This is particularly important at elevated operating voltages.

The differential amplifier DA' is a d-c amplifier which has two pnp transistors 140, 141; the bases of each are connected to an output of Hall generator 1. The emitters of transistors 140, 141 are each connected over a resistor 142, 143 together, and over a common resistor 144 with positive bus P'. Resistors 142, 143 are relatively small and are used as feedback resistors for essential linearization of amplification by the differential amplifier DA'. The collector of transistor 140 is connected with the output Y and over resistor 145 with a junction 146 which is connected through a protective diode 247 to negative bus N'. Protective diode 247 protects the motor and the circuit against reverse polarity. In operation, a voltage drop of about 0.8 V occurs across diode 247. This voltage drop is utilized in the circuit to provide for reliable blockage of the final output transistors, as described in the aforementioned U.S. Pat. No. 4,030,005.

The collector of transistor 141 is connected to the output Y' of the amplifier DA' and over resistor 147 with the junction 146.

The two output stages of the circuit of FIG. 10 are constructed as Darlington circuits having, at the left side of FIG. 10, two npn transistors 150, 151 in the well-known Darlington circuit, and at the right side two npn transistors 152, 153, similarly connected. The transistors 151, 153 are connected to the circuit of the motor windings 2, 3, respectively, which are respectively connected between the collector of the associated transistor and the positive bus P'. The emitters of the transistors 151, 153 are connected to junction 154 which, in turn, is connected over a low resistance resistor 155 with junction 146. Resistor 155 is provided to ensure that only one of the two transistors 151 or 153 may be conductive, which is particularly important for starting at high operating temperatures and, additionally, it acts as a feedback resistor and limits the starting current, as will be explained below.

The collectors of transistors 150, 151 are connected; the collectors of transistors 152 and 153 are connected; the base of transistor 151 and the emitter of transistor 150 and the base of transistor 153 and the emitter of transistor 152 are likewise connected.

The base of transistor 151 is connected over a resistor 156 with the base of transistor 153 and over a resistor 157 with the bus N'. A capacitor 158 is connected between the base of transistor 150 and the output Y. A capacitor 159 is connected between the base of transistor 152 and the output Y'.

The cathode of diode 162 is connected to the base of the transistor 150 and the cathode of a diode 163 is connected to the base of transistor 152. The anodes of the diodes are connected together and through a resistor 164 to junction 154.

A resistor 165 connects junction 154 to the Hall generator 1. A low resistance resistor 166 is connected across the Hall generator 1. Resistors 167, 166, 165 form a voltage divider which provides operating voltage to the Hall generator 1 at essential independence of temperature. This is important since the inherent resistance and the output voltage of a Hall generator greatly drop with increasing temperature. The circuit of FIG. 8, for example, shows a comparatively high temperature dependence for the output voltage of Hall generator 1. The resistance 166 reduces the output signal from the Hall generator 1, since current from resistor 167 can flow only partially through Hall generator 1, but the output signal received therefrom is much less temperature dependent. This is particularly important in motors for fans since fans must operate, reliably, in conditions of highly varying ambient temperatures. By suitable choice of resistor 166, the output signal derived from the Hall generator —which, unfortunately, can vary within wide limits—can be made comparatively independent of the quality of the Hall generator used. Thus, an output signal of sufficient value to permit the circuit to function can still be obtained. The resistance 166, therefore, is preferably suitably selected in dependence on the quality of the particular Hall generator used in the circuit.

If the voltage between buses P', N' is about 20 to 30 volts, then the following values are suitable:

| Hall generator 1 | Siemens SBV 566 |
|---|---|
| resistors 165, 167 | 0.47 kΩ |
| resistor 144 | 6.2 kΩ |
| resistors 142, 143 | 0.1 kΩ |
| resistor 166 | 18...27 Ohm |
| resistor 164 | 22 kΩ |
| resistor 155 | 5 Ohm |
| resistors 145, 147 | 5 kΩ |
| resistors 156, 157 | 0.75 kΩ |
| capacitors 158, 159 | 4.7 μF tantalum |
| transistors 140, 141 | BC 307 |
| transistors 150, 152 | BC 547 |
| transistors 151, 153 | BC 235 |

Operation: Initially, and upon starting, capacitors 158, 159 are discharged. Since the rotor R has a preferred position, Hall generator 1 will be subjected to magnetic field from the rotor, either a Northpole or a Southpole. The rotor R, let it be assumed, is so positioned that the right output of Hall generator 1 is more negative than the left output, so that transistor 141 will become conductive and transistor 140 will block. Capacitor 159 will be charged through resistors 144, 143, transistor 141, and the emitter-base paths of the transistors 152, 153, resistor 155 and diode 247. The charge on the capacitor 159 will be with the polarity as shown in FIG. 10. As the capacitor charges, transistors 152, 153 will become conductive and winding 3 will receive current. Rotor R will begin to rotate in the desired direction. Hall generator 1 will, therefore, be placed in the region of a pole of opposite polarity. Its left output will become more negative than its right output, transistor 141 will block, and transistor 140 will become conductive. Transistors 152, 153 will block, and capacitor 158 will be charged in similar manner. Transistors 150 and 151 will become conductive and current will flow through winding 2. Simultaneously, capacitor 159 will discharge over its relatively high resistance discharge circuit, namely resistors 147, 155, 164 and through the previously blocked diode 163. It is to be noted that charge and discharge occur over non-linear resistance paths, namely over respectively different diode paths, in series with ohmic resistors. The discharge circuit, in the example shown, has a resistance of about 27 kOhm which increases with decreasing voltage at capacitor 159, since the conductivity of diode 163 increases, as known. Thus, charge is rapid; discharge is comparatively long. In steady state condition, that is, when the motor runs at design speed, for example about 3000 rpm, charge and discharge must balance each other; this means that, depending on the value of resistor 164, the charge time, that is the time during which transistors 152, 153 are conductive, is shorter than the discharge time. Since the resistor 164 is common to both discharge circuits, it is possible to linearize the current gaps therewith. Increasing the resistance value of resistor 164 also increases the gap between current pulses. Charge and discharge time, together correspond to 360°-el. It is thus possible to make the duration of a current pulse shorter than 180°-el., for example between about 120°-160°-el. This is important for the reasons above stated, and additionally for the efficiency of operation of the motor, for proper loading of the power transistors and for silent operation of the motor, as well as for avoidance of radio noise interference.

The voltage pattern is approximately trapeze shaped. It is important that this voltage at the outputs Y, Y' has flanks with relatively low slope, which can be obtained by approximately linear amplification of the differential amplifier DA'. The feedback resistors 142, 143 contribute to linearity and are preferred in use.

Upon starting, the motor current is comparatively high since no counter-emf is induced in windings 2, 3 from the rotor R. In a fan which, in continuous operation, has a current requirement of about 0.1 A, starting current may go to about 0.6 A. To limit the starting current, resistor 155 is used. The resistor 155 is of comparatively low resistance. At 0.6 A, a voltage drop of about 3 V is suitable. This decreases current through the Hall generator 1 and, consequently, its output signal will decrease, limiting motor current. Due to the feedback, current supply can be designed for lower power, that is, if the power supply is derived from the on-board network of a vehicle, a smaller loading on a vehicle battery is placed thereby. It has been found that the feedback does not essentially influence the operation of the differential amplifier DA', since it uses transistors of another polarity and thus permits use of a common emitter resistor 144 connected to the bus P', whereas the common emitter resistor 155 of the power transistors is connected to the bus N'. Use of transistors of reverse polarity between the differential amplifier and the power transistor, or power transistor combination, permits a simple feedback circuit. The common resistor 155 further permits reliable starting at high temperatures since only one winding, that is, either winding 2 or winding 3, is energized.

The resistors 156, 157 are directly connected to the bus N'. They can be selected to have a higher resistance value which is good for better amplification. They could, however, also be connected to the junction 146.

Upon blocking of the rotor of the motor, that is, for example upon stalling by external blockage, one of the capacitors 158, 159 will be charged (as in FIG. 8), viz. the one connected to that transistor 140, 141 which is conductive. When the respective capacitor has received a charge voltage of about 8 V, no more charge current flows therethrough and the associated power transistor is deenergized. The resistors 145, 147, for this reason, are therefore preferably selected to have a value of such magnitude that the associated resistor 145, 147 provides a voltage drop of about 10 V in the current carrying branch of the differential amplifier DA'. When using electrolytic capacitors, which is desirable due to the high capacity values required—about 3 to 10 $\mu$F—it is important to hold the charge voltage to a low value due to the leakage currents which invariably arise. The high current amplification of the Darlington-power stages could load to conduction of these power stages even at relatively low leakage currents, which, under blocked rotor conditions, will lead to possible destruction since the transistors will become warm and the effect will become cumulative due to the heating of the transistors themselves and the consequently increased current flow therethrough. This tendency can be reliably prevented by suitable choice of the design values of the components, for example as set forth in the above illustrative example for typical values of circuit components.

The signal transferred by capacitors 158, 159 must be sufficiently high so that the non-linear elements at the output of the capacitors can process the signal non-linearly to obtain the necessary d-c voltage components. If the signal transferred by capacitor 158, or 159, respectively, is very small, then the non-linear elements would function for small signal differences essentially as linear devices and reliable protection against blocking cannot be obtained under all conditions. This is particularly noticeable when using Hall generators of low output voltage, or in operation at high temperatures. A linear preamplifier is thus of great advantage in order to obtain output signals of sufficient value which permits the non-linearities of the circuit to become truly effective. The circuit of FIG. 10 provides output voltages from the differential amplifier DA with approximately 5 V peak-to-peak. This is entirely sufficient in order to completely utilize all non-linearities. It is also important that the output signal at the outputs Y, Y' has an approximately trapeze-shaped wave form, as illustrated in FIG. 9 graph B and that the steepness of the flanks F of the trapeze is not excessive and is not further enhanced by the differential amplifier. In this connection, reference is made to the discussion in U.S. Pat. No. 4,030,005, Doemen, with respect to FIGS. 3 and 4 thereof.

Various changes and modifications may be made, and features described in connection with any one of the embodiments may be used with any one of the others, within the scope of the invention concept.

I claim:

1. Brushless d-c motor comprising a permanent magnet rotor (R) and stator winding means (2, 3, 110) and a Hall effect device (1) positioned to be controlled by magnetic flux from said permanent magnet rotor, the magnitude and direction of said flux being rotor position dependent, said Hall effect device providing in operation two output signals at its outputs, electrical commutating device means connected to be controlled by the output signals of said Hall effect device to selectively connect said stator winding means (2, 3) to a source of power to generate, in operation, an alternating magnetic field, means (Y, Y') to supply current to said Hall effect device (1), and means (9) to modulate the Hall supply current supplied by said current supply means in synchronism with the rotor rotation to reduce said Hall supply current when the flux density at the Hall effect device is zero or in the neighborhood of zero, and to control said commutating device means to substantially reduce or interrupt the current flowing in said stator winding means at the instant when the flux density from the rotor (R) to which the Hall effect device is exposed is zero or in the neighborhood of zero.

2. Motor according to claim 1, wherein the commutating device means comprise two substantially identical amplifier means, each controlled by an associated output of said Hall effect device and each controlling at its output a current through the stator winding means, said winding means generating in operation said alternating magnetic field, wherein said modulating means comprises means for deriving from said two windings an undulating voltage representative of rotation of said rotor, and means controlling said current supplied to the Hall effect device (1) as a function of said undulating voltage.

3. Motor according to claim 2, wherein filtering means (90, 93, 94) is provided connected to said undulating voltage to level said undulating voltage before feeding it to said Hall current control means (84).

4. Motor according to claim 3, including phase shifting means (85) for shifting the phase of said undulating voltage before supplying it to said Hall current control means (84).

5. Motor according to claim 1, wherein said modulating means comprises a frequency dependent two-terminal network which, at the switching rate of the stator currents, as controlled by said commutating device means, acts as a current source for the Hall generator while, for zero frequency, it forms a voltage source of comparatively small internal resistance.

6. Motor according to claim 1, wherein said modulating means comprises an auxiliary commutating sensing winding (51), in electrodynamically coupled relation with the rotor (R) and in which, upon rotation of the rotor, a signal is induced, said signal being applied to modulate the current supplied to said Hall effect device.

7. Motor according to claim 6, wherein filtering means (90, 93, 94) is provided connected to said undulating voltage to level said undulating voltage before feeding it to said Hall current control means (84).

8. Motor according to claim 7, including phase shifting means (85) for shifting the phase of said undulating voltage before supplying it to said Hall current control means (84).

9. Motor according to claim 1, wherein the permanent magnet rotor has approximately trapezoidal spatial distribution of the exciting magnetic induction field; and wherein the duration of interruption of the stator current corresponds, approximately, to the rise or fall time of the approximately trapezoidal voltage induced in the stator winding due to rotation of the permanent magnet rotor.

10. Motor according to claim 9, wherein the motor comprises means generating an auxiliary torque which is circumferentially displaced relative to the electrodynamic torque generated by electrodynamic interaction of the motor field and the stator winding during energization of the stator winding.

11. Brushless d-c motor comprising
a permanent magnet rotor (R) and stator winding means (2, 3, 110),
a Hall effect device means (1) positioned to be controlled by magnetic flux from said permanent magnet rotor, the magnitude and direction of said flux being rotor position dependent and comprising at least two points of zero flux density per revolution, said Hall effect device means providing, in operation, two output signals at its outputs;
d-c amplifier means (DA, DA'; 140, 141; 142–147) connected to the Hall effect device means (1) for amplification of the output signals thereof;
electrical commutating device means (150, 151; 152, 153) connected to be controlled by the outputs of said device amplifier means to selectively connect said stator winding means to a source of power (P, N) to generate, in operation, a varying magnetic field;
a capacitative coupling element (6, 7, 106, 107; 158, 159) connected between each output of the Hall effect device means and the associated input of the associated commutating device means; and
non-linear resistance means connected between each capacitative coupling element and the associated input of the associated commutating device means to introduce non-linearities in the signals applied to the commutating device means, the non-linear resistance means substantially reducing or interrupting the current flow in said stator winding means (2, 3, 110) when the flux density from the rotor (R) to which the Hall effect device means is exposed is zero and/or in the neighborhood of zero.

12. Motor according to claim 11, wherein said non-linear resistance means comprises a semiconductor—resistance network.

13. Motor according to claim 11, wherein the permanent magnet rotor has approximately trapezoidal spatial distribution of the exciting magnetic induction field; and
wherein the duration of interruption of the stator current corresponds, approximately, to the rise or fall time of the approximately trapezoidal voltage induced in the stator winding due to rotation of the permanent magnet rotor.

14. Motor according to claim 11, wherein the motor comprises means generating an auxiliary torque which is circumferentially displaced relative to the electrodynamic torque generated by electrodynamic interaction of the motor field and the stator winding during energization of the stator winding.

15. Motor according to claim 11,
wherein the capacitative coupling elements are connected between the outputs (Y, Y') of the amplifier means and the associated inputs of the associated commutating device means (104, 105, 122; 150–153).

16. Motor according to claim 11, wherein said amplifier means comprises differential amplifier means.

17. Motor according to claim 11, wherein said amplifier means comprises essentially linearly amplifying means.

18. Motor according to claim 11, wherein the amplifier means include signal limiting means to provide output signals having flanks (FIG. 9: F) of limited steepness or slope.

19. Motor according to claim 18, wherein the slope of the blanks extends over an electrical angular range of about between 10°-el. to 35°-el.

20. Motor according to claim 11, wherein the commutating device means comprises a bridge circuit (122); and
said stator winding means includes a single motor winding (110) connected across the diagonal of the bridge circuit (122).

21. Motor according to claim 11, wherein the commutating device means includes two amplifying transistor (151);
two stator winding means (2,3) are provided, one, each, being supplifed by a respective transistor of the commutating device means; and
a common emitter resistor (155) for said transistors (151, 153).

22. Motor according to claim 19, wherein the common emitter resistor (155) is connected in circuit with the current supply circuit for the Hall effect device means (1) providing negative feedback thereto.

23. Motor according to claim 11, wherein the capacitive coupling element (158, 159) comprises an electrolytic capacitor; and
wherein the amplifier means provides output voltages which, upon blockage of the rotor of the motor do not exceed about 10 V applied to a respective electrolytic capacitor.

24. Motor according to claim 11, wherein the commutating device means comprises a bridge circuit (122); and
said stator winding means includes motor coil means (110) connected across the diagonal of the bridge circuit (122).

25. Motor according to claim 11, wherein the electrical commutating device means includes power transistors (150, 151; 152, 153) having a first conductivity type (npn), and a common emitter-resistor (155) for said transistors, connected to the emitters of the transistors and to one terminal (M) of the source of power; and
the d-c amplifier means including amplifying transistors (140, 141) of a conductivity type (pnp) opposite the first conductivity type, and a common emitter-resistor (144) connected to the emitters of said amplifying transistors and to the other terminal (P) of said source of power, to connect the power transistors in a first feedback circuit, and the amplifying transistors in a second feedback circuit, said first and second feedback circuits being independent and separate from each other by connection to different terminals of said source of power.

26. Motor according to claim 25, wherein said amplifier means comprises a differential amplifier means; the capacitative elements (158, 159) are connected between the outputs (Y, Y') of the differential amplifier means, and the associated inputs of the associated power transistors (150, 151; 152, 153);
and the common emitter-resistor (155) connected to said power transistors is connected in circuit with the current supply circuit for the Hall effect device means (1) to provide negative feedback thereto.

27. Motor according to claim 26, wherein the capacitative coupling element (158, 159) comprises an electrolytic capacitor; and wherein the amplifier means provides output voltages which, upon blockage of the rotor of the motor do not exceed about 10 V applied to a respective electrolytic capacitor.

28. Motor according to claim 11, wherein said electrical commutating device means (150, 151; 152, 153) selectively connects said stator winding means (2, 3, 110) to generate, in operation, an alternating magnetic field.

29. Brushless d-c motor comprising a permanent magnet rotor (R) and stator winding means (2, 3, 110);

galvano/magnetic flux sensing means (1) positioned to be controlled by magnetic flux from said permanent magnet rotor, the magnitude and direction of said flux being rotor position dependent and comprising at least two points of zero flux density per revolution;

said galvanomagnetic flux sensing means providing, in operation, output signals at its output;

d-c amplifier means (DA, DA') connected to the galvanomagnetic flux sensing means (1) for essentially linear amplification of the output signals thereof;

electrical commutating device means (150, 151; 152, 153) connected to be controlled by the outputs of said amplifier means to selectively connect said stator winding means to a source of power (P, N) to generate, in operation, a varying magnetic field;

coupling elements (6, 7; 106, 107; 158, 159) connected between the output of the essentially linear amplifier and an associated input of the commutating device means; and non-linear resistance means connected between each coupling element and the associated input of the associated commutating device means to introduce non-linearities in the signals applied to the commutating device means, the non-linear resistance means substantially reducing or interrupting the current flow in said stator winding means (2, 3, 110) when the flux density from the rotor (R) to which the galvanomagnetic flux sensing means is exposed is zero or in the neighborhood of zero.

30. Motor according to claim 29, wherein the amplifier means comprises an amplifier which provides two outputs controlling respectively, conduction and non-conduction of said commutating device means (150, 151; 152, 153); and the coupling elements comprise capacitative coupling elements (6, 7; 106, 107; 158, 159) connected between the output of the linear amplifier and the inputs of the commutating device means.

31. Motor according to claim 29, wherein the amplifier means comprises a differential amplifier.

32. Motor according to claim 29, wherein the electrical commutating device means (150, 151; 152, 153) connects said stator winding means to generate, in operation, an alternating magnetic field.

* * * * *

UNITED STATES PATENT AND TRADEMARK OFFICE
CERTIFICATE OF CORRECTION

PATENT NO. : 4,230,976
DATED : Oct. 28, 1980
INVENTOR(S) : Rolf Muller

It is certified that error appears in the above—identified patent and that said Letters Patent is hereby corrected as shown below:

The term of this patent subsequent to November 28, 1979 has been disclaimed.

Signed and Sealed this

Sixteenth Day of December 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,230,976

DATED : October 28, 1980

INVENTOR(S) : Rolf MULLER

It is certified that error appears in the above—identified patent and that said Letters Patent is hereby corrected as shown below:

Please change the following:

Column 18, Claim 19, second line, change "blanks" to <u>flanks</u>.

Signed and Sealed this

Third Day of March 1981

[SEAL]

Attest:

RENE D. TEGTMEYER

Attesting Officer     Acting Commissioner of Patents and Trademarks

UNITED STATES PATENT AND TRADEMARK OFFICE
CERTIFICATE OF CORRECTION

PATENT NO. : 4,230,976
DATED : October 28, 1980
INVENTOR(S) : Rolf Muller

It is certified that error appears in the above—identified patent and that said Letters Patent is hereby corrected as shown below:

The term of this patent subsequent to November 28, 1996 has been disclaimed.

This certificate supersedes Certificate of Correction issued December 16, 1980.

Signed and Sealed this

Twenty-ninth Day of June 1982

[SEAL]

Attest:

*Attesting Officer*

GERALD J. MOSSINGHOFF
*Commissioner of Patents and Trademarks*